United States Patent [19]
Barker et al.

[11] Patent Number: 5,931,916
[45] Date of Patent: Aug. 3, 1999

[54] METHOD FOR RETRANSMITTING DATA PACKET TO A DESTINATION HOST BY SELECTING A NEXT NETWORK ADDRESS OF THE DESTINATION HOST CYCLICALLY FROM AN ADDRESS LIST

[75] Inventors: Richard J. Barker; Andrew M. Lucking; James C. T. Chapman, all of Ipswich, United Kingdom

[73] Assignee: British Telecommunications public limited company, London, United Kingdom

[21] Appl. No.: 08/849,347

[22] PCT Filed: Dec. 8, 1995

[86] PCT No.: PCT/GB95/02886

§ 371 Date: Jun. 9, 1997

§ 102(e) Date: Jun. 9, 1997

[87] PCT Pub. No.: WO96/18256

PCT Pub. Date: Jun. 13, 1996

[30] Foreign Application Priority Data

Dec. 9, 1994 [EP] European Pat. Off. .............. 94309231

[51] Int. Cl.⁶ ...................................................... G06F 13/00
[52] U.S. Cl. ........................... 709/239; 709/238; 709/242
[58] Field of Search ...................................... 709/239, 238, 709/242, 244, 249; 370/216, 403, 394, 422

[56] References Cited

U.S. PATENT DOCUMENTS

| | | | |
|---|---|---|---|
| 4,058,672 | 11/1977 | Crager et al. ............................ | 370/394 |
| 4,901,312 | 2/1990 | Hui et al. ................................ | 370/403 |
| 4,947,389 | 8/1990 | Eng et al. ............................... | 370/403 |
| 5,088,032 | 2/1992 | Bosack .................................... | 709/242 |
| 5,260,933 | 11/1993 | Rouse ...................................... | 370/216 |
| 5,293,488 | 3/1994 | Riley et al. ............................. | 709/244 |
| 5,432,907 | 7/1995 | Picazo, Jr. et al. ..................... | 709/249 |
| 5,541,911 | 7/1996 | Nilakantan et al. .................... | 370/422 |

FOREIGN PATENT DOCUMENTS

0512174A1 11/1992 European Pat. Off. .
WO 84/00860 3/1984 WIPO .

*Primary Examiner*—Le Hien Luu
*Attorney, Agent, or Firm*—Nixon & Vanderhye P.C.

[57] ABSTRACT

In a multi-processor environment, a plurality of nodes interconnected by a number of networks each run a number of users processes and messages transferred by the processes are transmitted sequentially from a transmitting node to a receiving node using a different network for each datagram to be transferred.

15 Claims, 13 Drawing Sheets

METHOD FOR RETRANSMITTING DATA PACKET TO A DESTINATION HOST BY SELECTING A NEXT NETWORK ADDRESS OF THE DESTINATION HOST CYCLICALLY FROM AN ADDRESS LIST

BACKGROUND OF THE INVENTION

1. Field of the Invention

The present invention relates to a multi-processor environment and more particularly to arrangements for transferring data between processes running in such environments.

2. Related Art

In complex systems, such as a telephone network for example, "intelligence" is present at many different points. A number of control processors provide the main functionality of the network, however, substantial processing capability also exists away from the central offices.

In particular, intelligent peripherals, that is peripherals including data processing decision-making capability will be present at the locations closer to the customer.

Facilities to be provided by an intelligent peripheral may not require the establishment of a physical connection through a particular network. Thus, some such intelligent peripherals may represent a node on several different operating networks. Further, where a network comprises a number of host computers, a process on one of the hosts may need to interact directly with a process on another.

Accordingly inter-process communications between processes running on different hosts must be reliable.

While permanent links between processes are reliable they represent substantial investment and are inflexible. Host computers are therefore more usually accessed through shared public networks such as the Internet.

The Internet provides a simple datagram facility to allow data to be transferred between host processes. The transfers use a simple user datagram protocol (UDP) provided by the Internet. Such a protocol is described, for example, by Postel, J in ARPANET Working Group Request for Comments number 768. While permitting a data transfer between processes the UDP datagram is not as reliable a method of transferring data on fixed or PSTN links.

Previous datagram transfer facilities including that known as TCP many result in break up of the data contained within the datagram since it does not preserve message boundaries and may take a considerable time to notify any failure of delivery, if indeed such notification is possible.

SUMMARY OF THE INVENTION

The present invention therefore seeks to provide a method of reliably transferring data across Internet type networks.

According to the present invention there is provided a method of transferring data packets between processes running in a multi-processor environment of the kind comprising a plurality of host computers each accessible at a plurality of network node addresses, the method comprising: establishing for each process to be addressed a destination host identity and a destination host port, establishing for each destination host identity an address list comprising a plurality of corresponding network node addresses, for each transmission of a data packet selecting from the respective address list for the destination host a network node address being the next address cyclically in the list to the last address used for transmission between the nodes, adding to the data packet a header defining the selected network node address and the destination port, monitoring return data for packet acknowledgement and retransmitting any data packet not so acknowledged to the next network node address in the address list.

Each message header sent between processes may include a message sequence number which is incremented by the transmitting processor such that the receiving processor may re-assemble messages in the correct order and identify the absence of one or more messages in a sequence of messages.

For longer data packets the header may also include a fragment number in respect of the particular data packet being transmitted. Where more than one process on a first host computer is interacting with one or more processes on a second host computer, the sequence number represents messages transferred between nodes and may not be in sequence with the fragment number which represents a series of port-messages being transferred between processes to enable the re-assertion of a complete message prior to formation to receiving user process.

BRIEF DESCRIPTION OF THE DRAWINGS

A distributed multi-processor network using the method of the invention will now be described by way of example only with reference to the accompanying drawings of which.

DETAILED DESCRIPTION OF EXEMPLARY EMBODIMENTS

Figure 1:
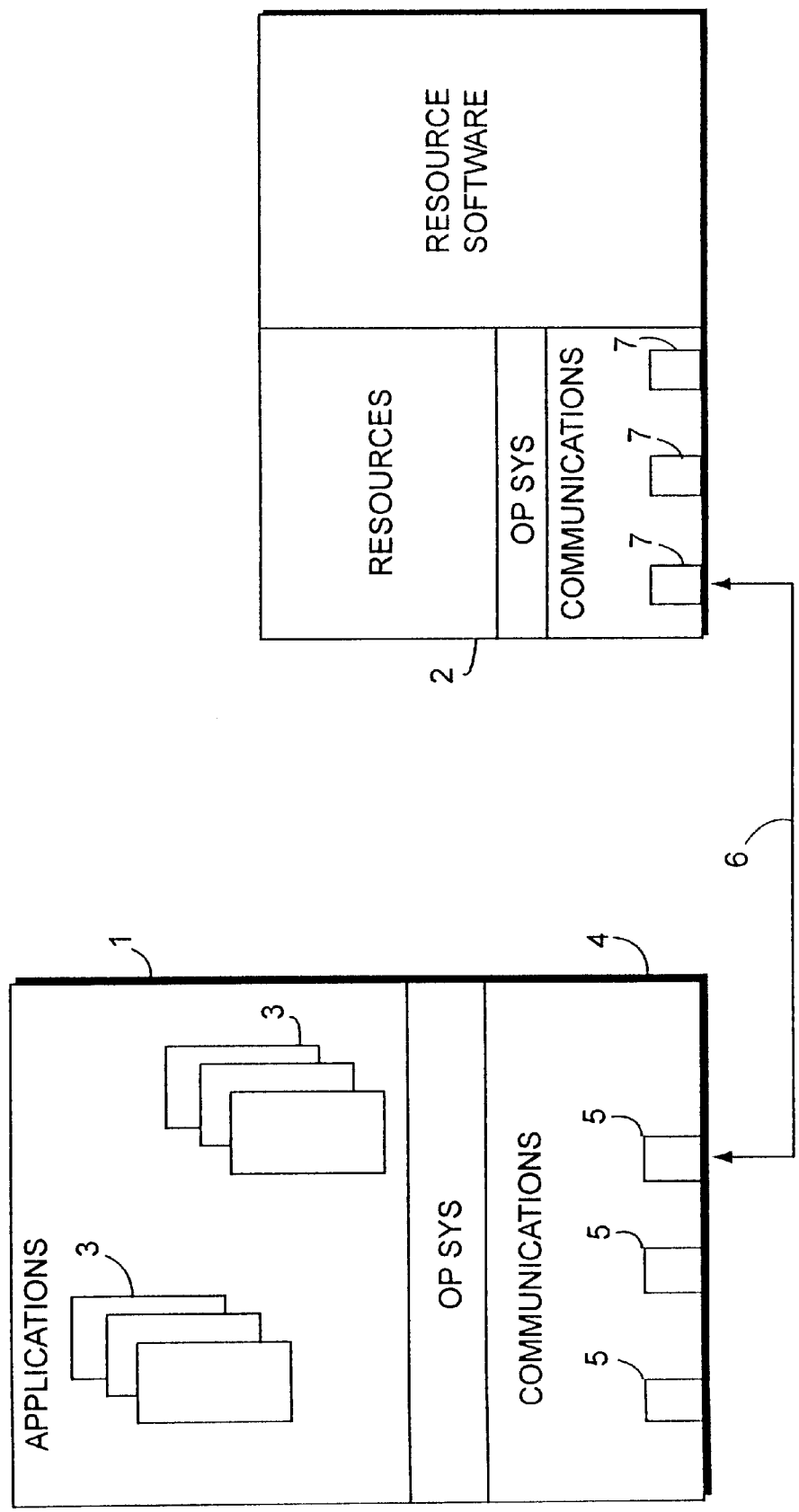
FIG. 1 shows schematically part of a telecommunications system.

Referring first to FIG. 1, a typical communications arrangement central office exchange will include a number of control processors 1 (only one of which is shown) and resources 2 which provide functions such as switch selection, telemetry and other networks based services.

Thus, when a control processor 1 identifies through the running of application software 3, that a particular resource 2 is to be used to carry out a function requested, it is necessary for the control processor 1 to transfer information in the form of a message to that resource 2.

In order to complete such an operation the control processor includes communications software shown schematically at 4 and a number of communications output ports 5. The telecommunication output ports 5 will be connected by way of one or more networks to the required resource. These networks are schematically represented as a message interface 6 in FIG. 1. Further details of the operation of message transfer will become apparent from the subsequent description.

Corresponding communications ports 7 are provided on the resource 2 to receive messages by way of varying networks.

Figure 2:
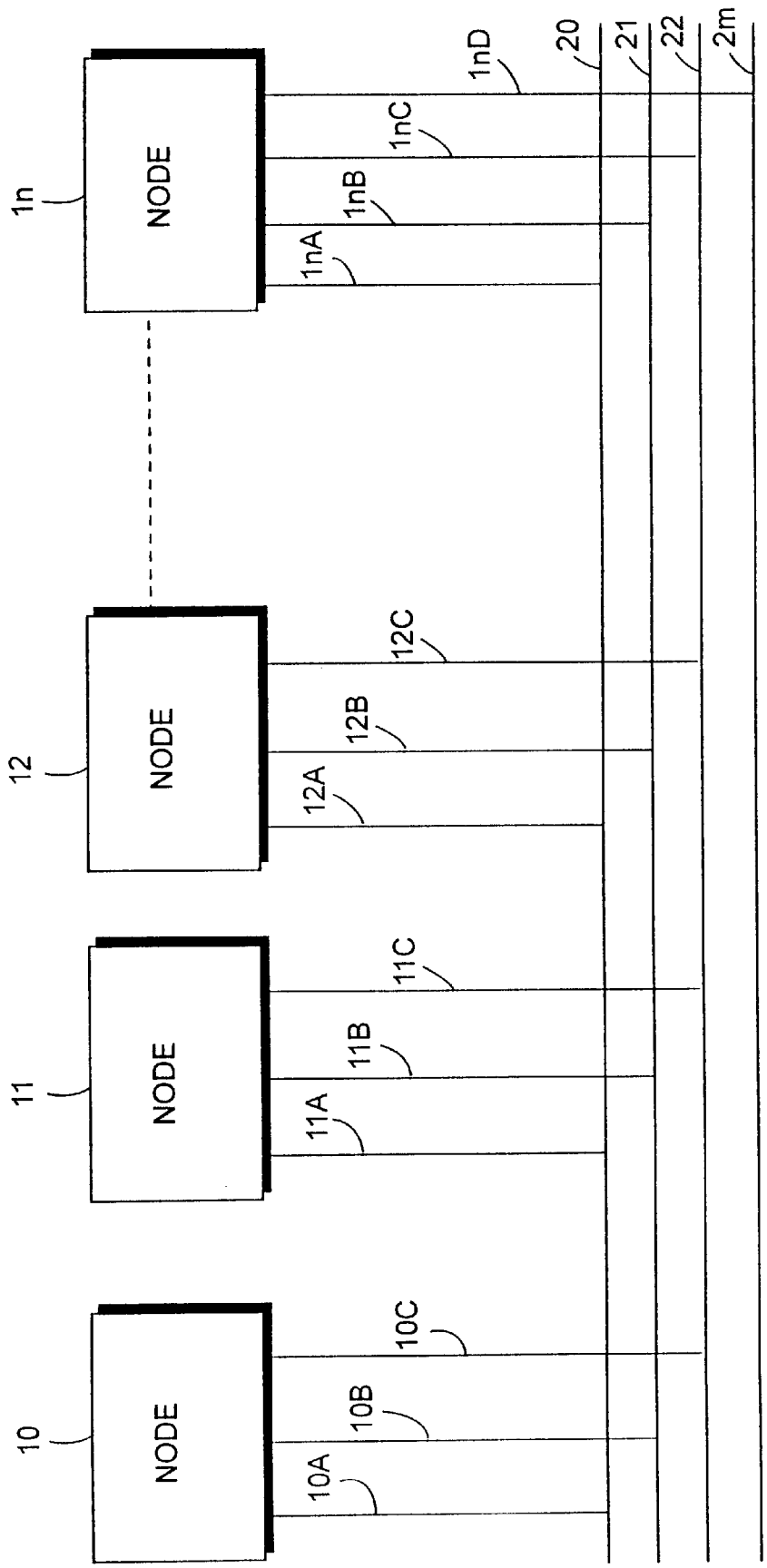
FIG. 2 shows a block schematic diagram of the distributed multi-processor network.

Referring additionally to FIG. 2, a number of nodes 10–1n are shown each connected to a number of networks 20–2m by way of respective communications ports 10a, 10b, 10c etc, these ports being representative of the communications ports 5 and 7 of FIG. 1. It will be noted that the connection pattern of the nodes 10–1n varies with not all nodes being connected to all networks. For example node 10 is connected by its respective ports to representative networks 20, 21 and 2m while node 11 is not connected to network 21 but is connected to network 22.

As has been previously referred, the communication link for networks 20–2m are of the kind sometimes included in the Internet which is provided with a simple datagram transfer protocol known as UDP. In user datagram protocol (UDP) there is a procedure for application programs to send messages to other programs. The message to be transferred is assembled as the number of data bytes to which the communications protocol adds a source identifier, a destination identifier and length and check sum bytes. The UDP software module uses source and destination addresses to form the Internet header and effects transfer of a data message between two processors. A typical UDP message is shown schematically in FIG. 4a to which reference is made later.

Figure 3:
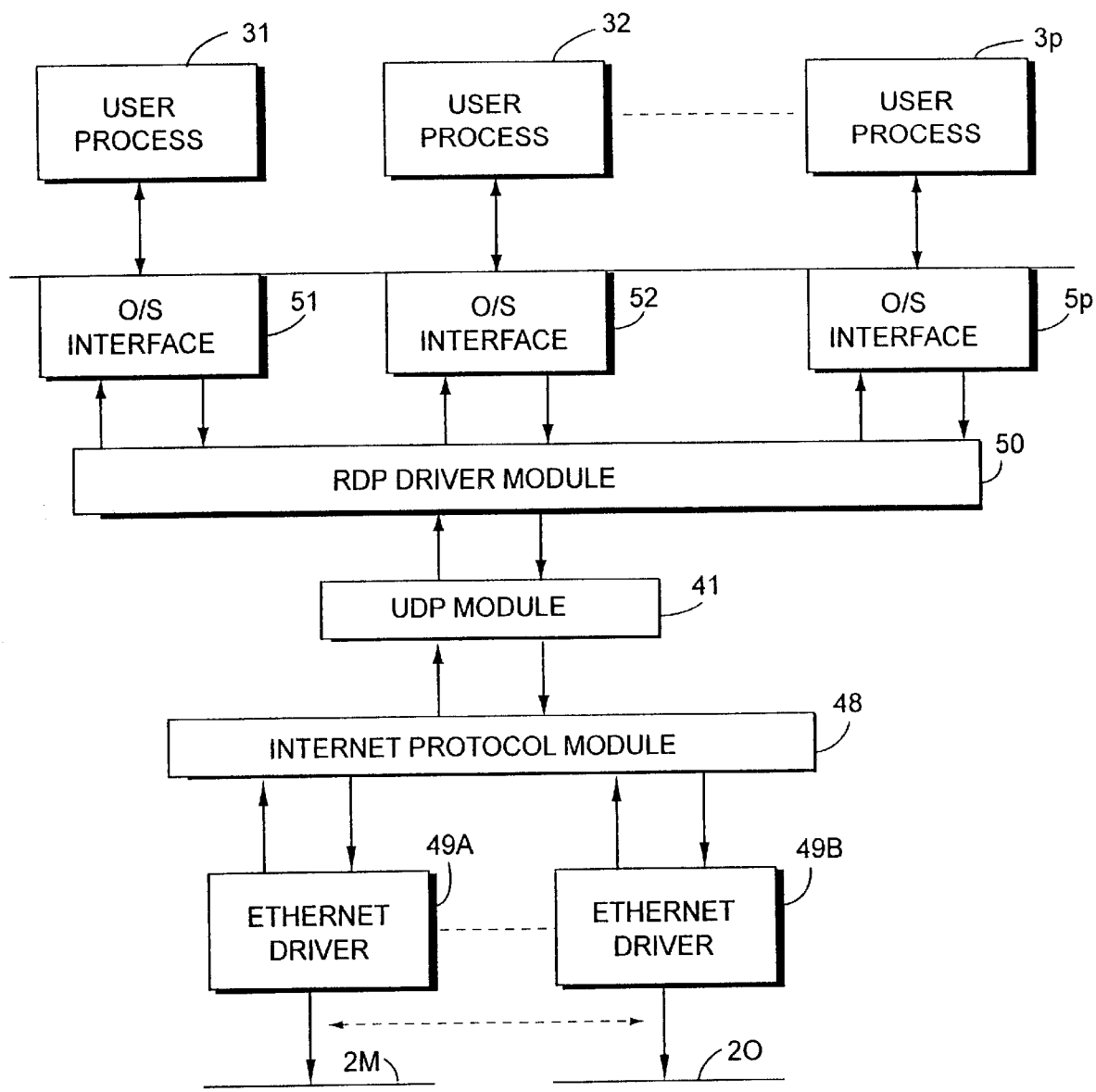
FIG. 3 shows schematically process interaction with the communications processes of the network of FIG. 2.

Referring now to FIGS. 1 and 3, software in control of resources 2 and the applications software 3 in the control processor 1 of FIG. 1 are represented by user processes 31-3p. If one user process 31-3p requires to transfer information to another user process 31-3p on the same or a different processor it assembles a datagram comprising a destination header and the data to be transferred.

Figure 4A:
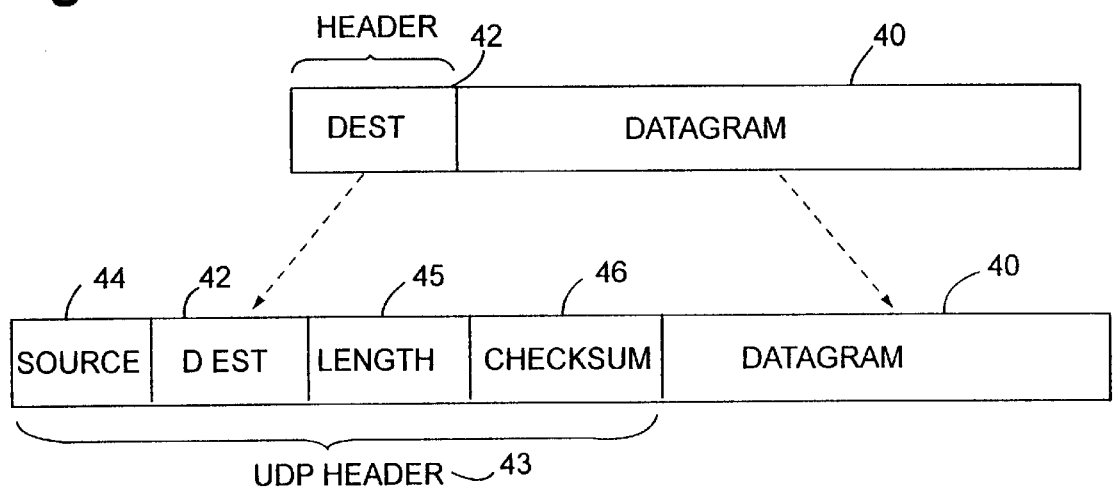
FIGS. 4A and 4B show schematically data and header information used in the protocol.

Referring additionally to FIG. 4A, in known systems the datagram 40 is passed to a UDP process 41 on the processor together with the destination node (Internet address) and port address in a header 42. The UDP process 41 uses the Internet address from the header 42 and adds further information in its own header 43. This further information includes the port address 44 of the source process 31-3p, a length byte 45 determined from the datagram 40 and a check sum byte 46 which may be used at the destination node to check whether an error in transmission has occurred.

The UDP process 41 will pass the complete UDP datagram 47 to an Internet protocol module 48 which transfers the data packet by way of an appropriate driver 49 to a network (say, 20) to the destination process. At the destination, the data received from the network 20 passes through the corresponding driver 49 and Internet module 48 to the UDP module 41 and thus to the destination process 31-3p.

Figure 4B:
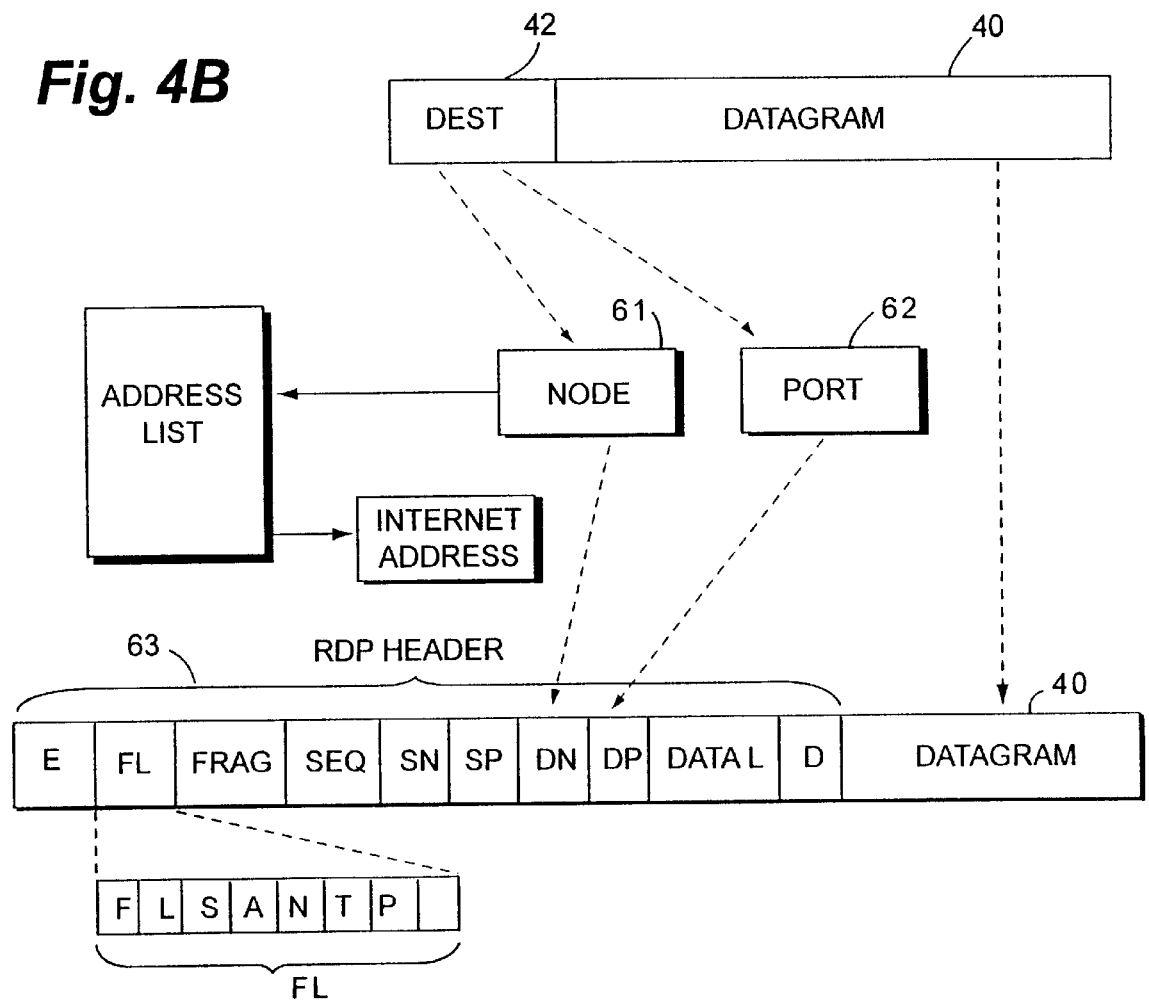

In the system of the invention a further process is introduced between the user processes 31-3p and the UDP process 41. This process, the RDP driver 50, receives the datagram 40 from the user processes 31-3p by way of Operating system interfaces 51-5p. These interfaces may be used to transfer data in systems which only use the UDP process 41 and are effectively data memory areas used for the transfer of data by the processes in areas of memory specified for the purposes. Referring now also to FIG. 4B, in this case the header 42 conveys an RDP node 61 and RDP port 62 address.

In some systems the user process 31-3p compiles datagrams to be transferred in memory areas allocated by the user process. Subsequently, by way of the operating system interfaces 51-5p the address of the stored datagram is transferred to the RDP module 50 which then recovers the datagram from the specified memory area for further processing. In other cases the assembled datagram may be transferred directly through the operating system interface 51-5p.

In the receiving node the RDP module 50 on receiving a datagram places the datagram in a port queue allocated memory space for the receiving process 31-3p.

Within the RDP driver 50, the destination node 61 is considered against a look up table to determine on which networks to which the source node is connected the destination node has appearances. Thus, considering FIGS. 2, 3 and 4 if a process 31 running in the node 10 requires to transfer a datagram 40 to a process 32 running in the node 12 then both of the nodes are connected by way of ethernet type networks 20 and 21. Therefore the RDP driver 50 will select one of these networks and will transfer the destination node address (16) in a DN byte of 16 bits. The destination port is assembled as a 16 bit byte (DP) while the source node (SN) and source port (SP) are similarly identified.

For the avoidance of doubt it is noted that the user processes 31-3p only use a single node address in respect of the destination process and the node address 61 is also for use by UDP and this translation translated by the RDP module 50 to one of several Internet addresses is transparent to the user.

It is also noted that the address list for a logical (RDP) address may be modified by user action to specify additional or alternative addresses even during the transmission of data packets to that logical node. The removal of addresses from the address list is also permissible, and a transmission of subsequent datagrams to the destination node will use the revised address list. This allows the user to amend networks in use without loss of any datagram in transit between ports on the nodes.

It is noted that each transmission between nodes uses the next available address from the address list unless that address has been marked as out of service. Thus, where a logical (RDP) address has more than one Internet address associated with it then the Internet addresses are used cyclically.

The other bytes in the RDP header 63 comprise an eight bit error field (E), a flag field (FL), fragment and sequence numbers (FRAG and SEQ respectively) and a data length field. These latter three fields each comprise 32 bits. The flag (FL) byte gives the following indications:

| | | |
|---|---|---|
| Bit 1 | First frag | Which indicates when a datagram has been split that this is the first fragment of the data and a fragment number (enclosed in field FRAG) is to be noted as the first fragment; |
| Bit 2 | Last frag | indicates the last fragment of a split datagram; |
| Bit 3 | Set sequence | A message to initialise sequence numbers between two nodes; |
| Bit 4 | Acknowledge | An acknowledgement of a previously received datagram; |
| Bit 5 | | Negative acknowledgement to previous datagram; |
| Bit 6 | | Test indicator; |
| Bit 7 | | High priority indicator; |
| Bit 8 | | Notification bit - used to indicate that the destination RDP process cannot deliver a valid datagram due to process queue having no space. |

Further understanding of the invention may be achieved by considering the transfer of a datagram between one user process and another. The data to be transferred, that is the data supplied by the user process, say 31, is packaged inside the RDP datagram, which itself is packaged inside a UDP datagram, that is to say the complete RDP datagram including its header is treated as a datagram of the form shown in FIG. 4A to which appropriate UDP header 43 is added.

The destination node identifier DN is translated into an appropriate Internet destination address and the datagram is transmitted to its destination node. The transmitting RDP process commences a time out. If this is the first message between the two nodes, regardless of the port within the node on which the datagram originates, the set sequence flag S will be set in the FL byte and the sequence byte (SEQ) will contain a number. For the time being it is convenient to ignore those bytes related to fragmentation of a datagram. The UDP module 41 acting as previously described delivers the datagram including the RDP header to the destination node. At the destination node the UDP header is stripped off and the datagram is passed to the RDP driver 50 of the destination node 12. The time out started in the RDP driver 50 of the originating node 10 awaits the receipt of a datagram from the destination node 12.

The RDP driver 50 of the destination node 12 on receipt of a first message sets its sequence number for receipt of datagrams from the respective source node identified by the SN byte to the sequence value specified in the sequence byte. The receiving RDP driver will return a datagram including the sequence number and with the acknowledge bit (A) set in the flag field.

The first datagram transferred between the transmitting node 10 and the destination node 12 does not currently carry any data from a user process although this is possible. The data length byte will be set to zero and no data will follow. In a development of the current system the first datagram transmitted is used to adapt a sliding window determining the number of datagrams which may be transferred between a transmitting node and a destination node prior to an acknowledgement being sent.

In this case when the first transmission occurs from the transmitting node 10 the node will include a value which the transmitting end is adapted to work to as a maximum. On receipt the destination node 12 either accepts the value proposed by the transmitting end if it is within the capability of the receiving node. If, however, the receiving node 12 has a maximum capacity (window) less than the value proposed by the transmitting node 10, then in returning an ACK (acknowledge signal) to the transmitting node the destination node 12 puts forward its own maximum value. The revised value is then adopted by the transmitting node 10.

If an acknowledgement of the first transmission is not received by the RDP process 50 of the first node 10 prior to the time out expiring the RDP driver 50 will attempt to forward the same datagram by way of an alternative network, 21 for example, and will mark the first RDP translation ie that which specifies node 12 as being on network 20 as failed. If a predetermined number of attempts to transmit to a particular address determined by the RDP translation fail then the RDP module 41 may identify this as a link failure and will mark the link out of service until a test datagram succeeds in identifying the particular link as re-established.

It should be noted that more than one process may be transferring data between the nodes 10 and 12 at the same time and such data will be transferred sequentially once a first successful data transfer has occurred and the initially transmitting node 10 has received a valid return datagram including the correct sequence number and setting of the A flag. Subsequent datagrams will be forwarded by the source node 10 without the S flag being set.

The RDP process 50 may make a number of attempts to forward a datagram between the source node 10 and the destination node 12 and will continue attempting to transmit the datagram by way of different network addresses until a predetermined number of attempts have been made. Once the predetermined number of attempts have been made a fail message will be returned to the originating process on the source node on the basis that the receiving node has failed. Further attempts to establish a route between the two nodes will be carried out using a new sequence number as previously described for initialisation of the transfer of datagrams between two nodes.

Using acknowledgements, retransmission, sequence numbers and multiple ethernet network interconnections, reliability of data transfer between data processes on separate nodes is achieved. The link between a sending process (31-3$p$) operating as a port on one node and a receiving process 31-3$p$ operating as a port on another node is connectionless. Consequently a sending process may send a series of datagrams to different receiving processes concurrently. Similarly, a receiving process may receive datagrams from a number of different sending processes.

Having established a data transfer path with an acknowledged sequence number, datagrams are sent with sequentially incremented sequence numbers from the source node to the destination node. The RDP driver 50 holds a copy of all transmitted messages until such time as an acknowledgement of the transmitted message has been received. A subsequent message is only forwarded from a first node to a second node once an acknowledgement has been received. However, in a preferred method of operation as hereinbefore referred to where a window of "N" messages is acceptable prior to acknowledgement being received, then messages may be transferred in sequence until the maximum number of outstanding ACK awaited datagrams has been sent. Thus, sequence numbers are incremented by the sending node RDP driver 50 for each transmitted datagram and reset if an acknowledgement is not received. The receiving RDP driver 50 checks the message sequence number upon the arrival of each datagram. The RDP driver 50 in the receiving node 12 has a limited number of sequence numbers which it can accept as valid. If the driver receives a sequence number that is incorrect, outside the maximum permitted value or there is some other failure, for example the destination host port specified in the datagram header being unknown to the receiving RDP driver, it will return a datagram with the "N" flag set thus causing the originating RDP module either to retransmit the original datagram or return the datagram to the originating process depending upon the reason for failure.

It is here noted that by rapidly identifying any failure and immediately returning a negative (NACK) signal through the transmitting node fast notification of any failure is received.

The RDP process 50 of the receiving node 12 expects to receive a datagram in sequence. However, provided that the sequence number of the datagram received is within the limit of the sliding window, such that the datagram received is not more than "N" greater than the last received and acknowledged datagram, then the module will hold the later received datagram pending receipt of earlier numbered datagrams. If a time out in the receiving module expires or the sequence number of a later received datagram is higher than the sequence number of a previously received datagram, then the receiving module will transmit an acknowledgement in respect of the latest consecutively received sequence numbered datagram. This acknowledgement also acknowledges all earlier sequenced numbered datagrams to the sending module. Thus, on receipt of the acknowledgement the RDP process 50 of the transmitting node 10 can reset its transmission window indicated to the extent by the last acknowledged datagram received by the receiving node 12. If the difference between the currently transmitted sequence number datagram and the last acknowledged sequence number datagram reaches "N" a new timeout expires. Further datagrams are transmitted until an acknowledgement is received and if not if retransmission of the earlier datagram will occur.

As previously noted the number of datagrams which may be forwarded without an acknowledgement being received may be negotiated between the originating node 10 and the receiving 12. In addition, a further security measure may include datagrams being sent by the receiving RDP driver with the "N" flag set being acknowledged by the originating RDP driver 50 before any acknowledgements for datagram following the ailed datagram will be sent. Thus, if the system is working with, say, a sequence number window of 10 then if previously sequence number to datagrams 1, 2, 4, 5 etc have been received, the datagram 3 has not then the RDP driver module 50 in the receiving node 12 will send an acknowledgement of datagram 2 The transmitting RDP module 50, expiring of the threat, would retransmit datagram 3.

On receipt of datagram 3 the RDP module 50 of the receiving node 12 may now transmit an acknowledgement of previously received datagrams with higher sequence numbers such that an acknowledgement of say datagram 8 may be the response to the retransmission of datagram 3.

Where the destination user process at the receiving node 12 is unable to accept datagrams as rapidly as they are being received, the RDP module 50 will place each received datagram in a queue. If the host processor has a limit on the size of the queue and the number of datagrams received and queued becomes too large, then the destination RDP module 50 will withhold acknowledgements to the transmitting node 10 for a short period while retrying adding the datagram to the queue. A number of attempts may be made to add the datagram to the queue but in the event that the maximum number of repeat attempts is exhausted a negative acknowledgement will be returned with the datagram to the originating node 10 thereby causing that node to retry the failed datagram to the user process.

Normally the RDP module does not forward any confirmation of delivery of a datagram to the user process, since in view of its reliability the user process does not expect to receive such acknowledgement. However, a user process may specifically request confirmation, in which case upon receipt of an acknowledgement from the receiving node the RDP module will forward confirmation of delivery by way of the operating system interface 51-50.

If the originating RDP driver 50 receives an acknowledgement with a sequence number which does not correspond to any of the datagrams forwarded but not yet acknowledged it will ignore the acknowledgement. When the timeout expires any failed transmission from the source to the destination is corrected.

In the receiving notice the RDP module can accept datagrams received with a sequence number which is in the range of (n−s) to ((n+s)−1) where n is the lowest sequence number received but not yet acknowledged and s is the number of datagrams the sending module may send without receiving an acknowledgement. In this case, the acknowledgement returned will be with the sequence number of the datagram most recently received in sequential order. This situation may arise if the receiving RDP driver forwards an acknowledgement to a previously received datagram and increments its sequence number but the returned acknowledgement is not received by the source node. As the time out in the first RDP driver expires the first RDP driver 50 at the source node 10 will attempt to retransmit.

It should be noted that on each occasion on which a new transmission path between two nodes is required to be established the set sequence flag and sequence number are transmitted from the source node to the destination node. Where data interchanges are occurring in both directions separate transfers are occurring, that is to say in one case the source node, say 10, initially sets the sequence in forwarding a first message to the destination node 12 and a separate sequence of messages will be commenced from the node 12 as source node to the node 10 as destination node. Transmissions in the first direction ie from node 10 to node 12 may use a different network to transmissions between the node 12 and the node 10.

Considering now the fragment byte FRAG and the first and last fragment flags F and L. If a datagram 40, received from a user process 31-3$p$, is of significant length then it may be necessary for the datagram to be sent in a series of fragments. Where this is the case the first transmission between the two nodes will indicate that the fragment is the first fragment F and has a fragment number which may or may not be equal to 1. On each transmission of a subsequent portion of the datagram 40 the fragment number FRAG is increased by one until the last fragment of the particular datagram 40 is transmitted in which case the L flag is set.

The complete datagram 40 may be reassembled at the destination node even if the fragments of the datagram are received out of sequence since the transfer data includes an indication of which fragment is first and which is last and a sequential numbering scheme in FRAG is used. Note that where fragmentation of user process datagrams is not required, as may be the norm, the bytes and bits allocated to the fragmentation process may be used for other purposes or may not be present at all. Where fragmentation is used, then unfragmented data packets transferred between nodes may have both first and last fragment (F & L) bits set in the flag (FL) byte. Other spare bytes may be provided in the header to allow for subsequent expansion of the functions of the system. This may be indicated during the initial set up of transmissions between the two nodes.

It will be appreciated that if a number of processes running as different ports of one particular node are communicating with one or more processes running as ports of the same destination node, then the interchange of messages between the two nodes may not be continuously the fragments of one datagram.

Where at any time multiple datagrams are being handled by the RDP module 50 resulting in a queue of datagrams awaiting transmission from a transmitting node to a receiving node. Then any datagram which the user process 31-3$p$ has specified as high priority by setting the p bit in the FL byte will be handled by the module 50 prior to handling of any other datagram transfer. In the event of a plurality of datagrams having high priority being queued the high priority datagrams will be forwarded in the order of receipt by the RDP module 50.

In the event that as hereinbefore described, a particular destination address for a particular RDP destination node has been determined as out-of-service the RDP process may send test messages on the failed route until such time as it receives an acknowledgement of that message. Such messages are indicated by setting the T flag in the flag field. Once one or more successful test messages have been transmitted the marker indicating unavailability of the address is discarded. Live data are not used for the purposes of testing failed routes.

On first marking a particular destination address within the address list as out-of-service, the RDP module 50 may notify one port at its node that the particular address link it to have failed and the specified address has been taken out of service. Such notification may be used by a process operating on that port to alert the user to the failure of single Internet links between nodes although the user will be otherwise unaware of such a link failure.

It should be noted that the ability of the RDP drivers 50 to identify datagrams which have failed to arrive at their destination and to rebuild a datagram where fragments are not received in a particular order (if applicable) ensures significant improvement in reliability over the normal UDP process. Thus, any failure of one of the networks 20–2m is overcome by the RDP process and the repeat attempts sometimes necessary by processes interconnected using only UDP may be eliminated.

Figure 5:
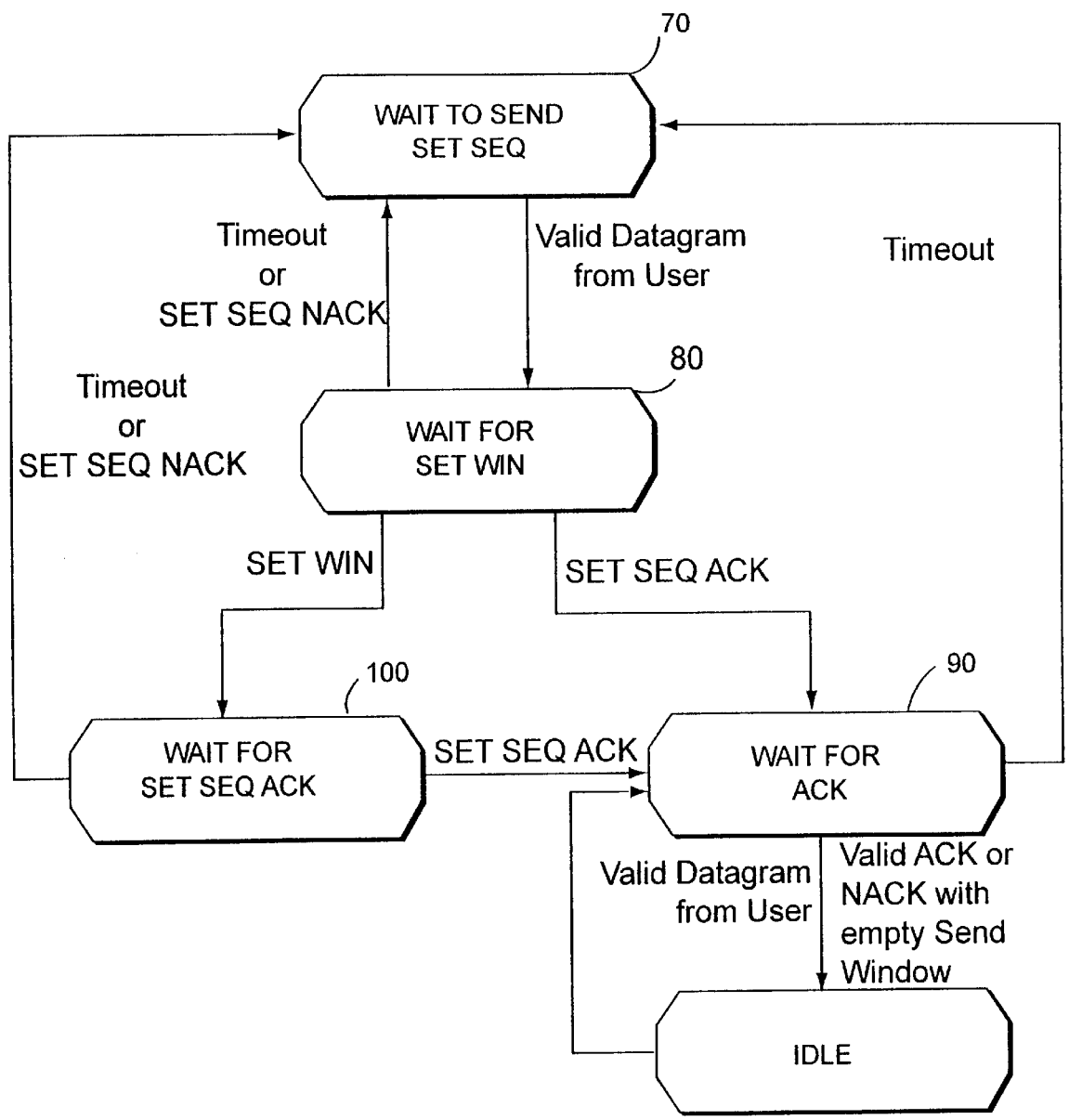
FIG. 5 is a state transition diagram showing the transmission end processor activity.
Figure 7:
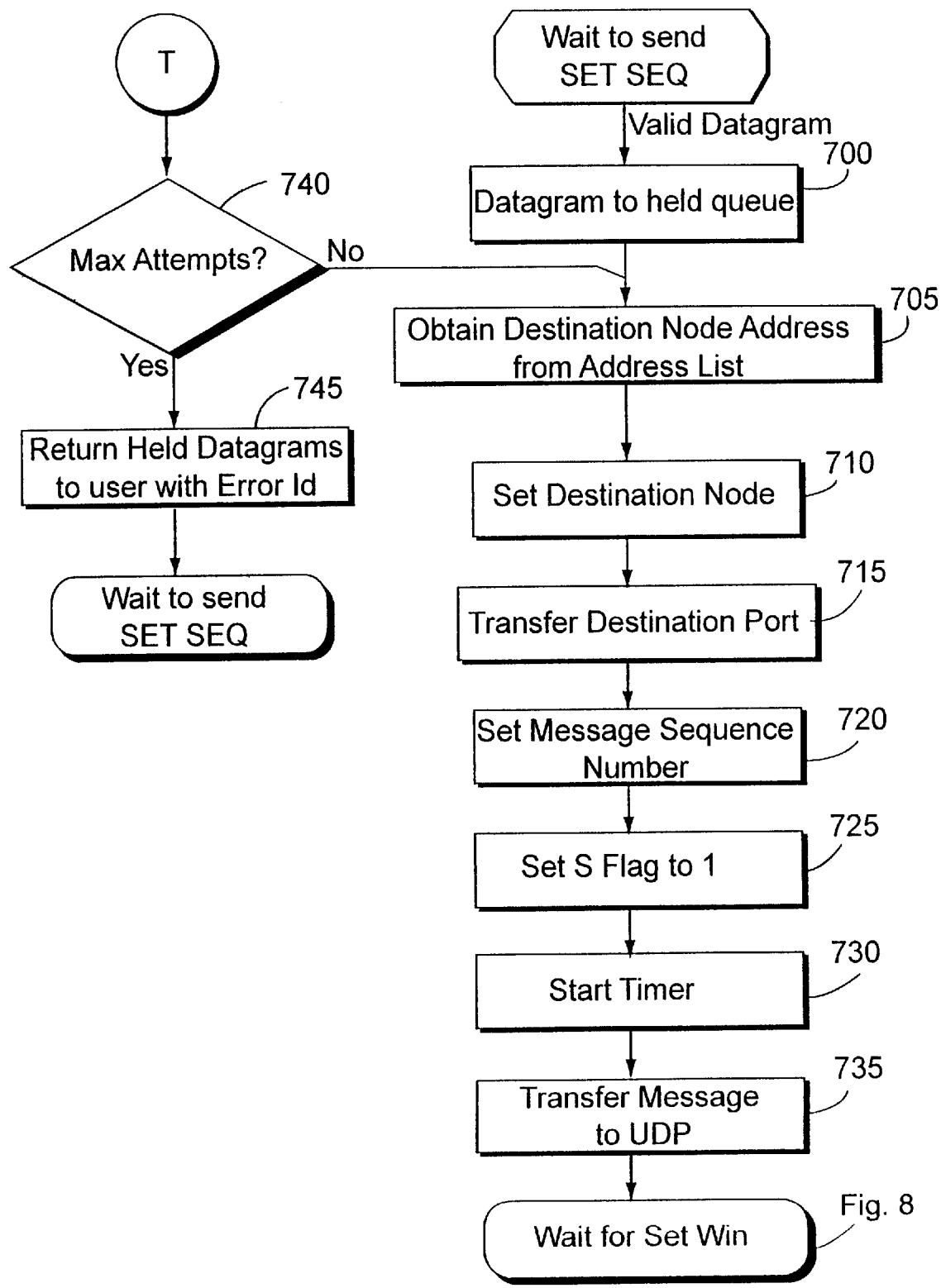
FIGS. 7 to 9 are flowcharts showing the operation of one of the modules of FIG. 3 in the transmitting node of the arrangement of FIG. 1.

Referring now to FIG. 5, the send state machine once initialisation has been completed by providing the address list of destination nodes and the like is quiescent in the wait to send set sequence state. On receipt of a valid datagram from a user process and now referring additionally to FIG. 7 and FIG. 4b, the RDP process 50 of FIG. 3 temporarily stores the datagram (step 700) and prepares a new datagram for transmission obtaining from the address list in respect of the specified destination node a new network destination node address (step 705). The DN field of the datagram is set to the given address. The destination port address is transferred to the destination port field DP at step 715 and a message sequence number proposed for use in the current transfer round is set in the SN bit at step 720. Finally, the S flag in the FL field of the RDP header 63 is set to 1 before a timer is started at step 730, this retransmission timer being approximately equal to the maximum time taken by any address relevant to this node for transmission of a datagram to a receiving node and receipt back of an acknowledgement multiplied by the acknowledgement window plus 2. Now at step 735 the complete RDP datagram is passed to the UDP module 41 of FIG. 3 together with the cyclicaddress of the destination node from the address list (obtained at step 205) for transfer to the Internet. The RDP module 50 now enters the wait for set window state 80.

Figure 8:
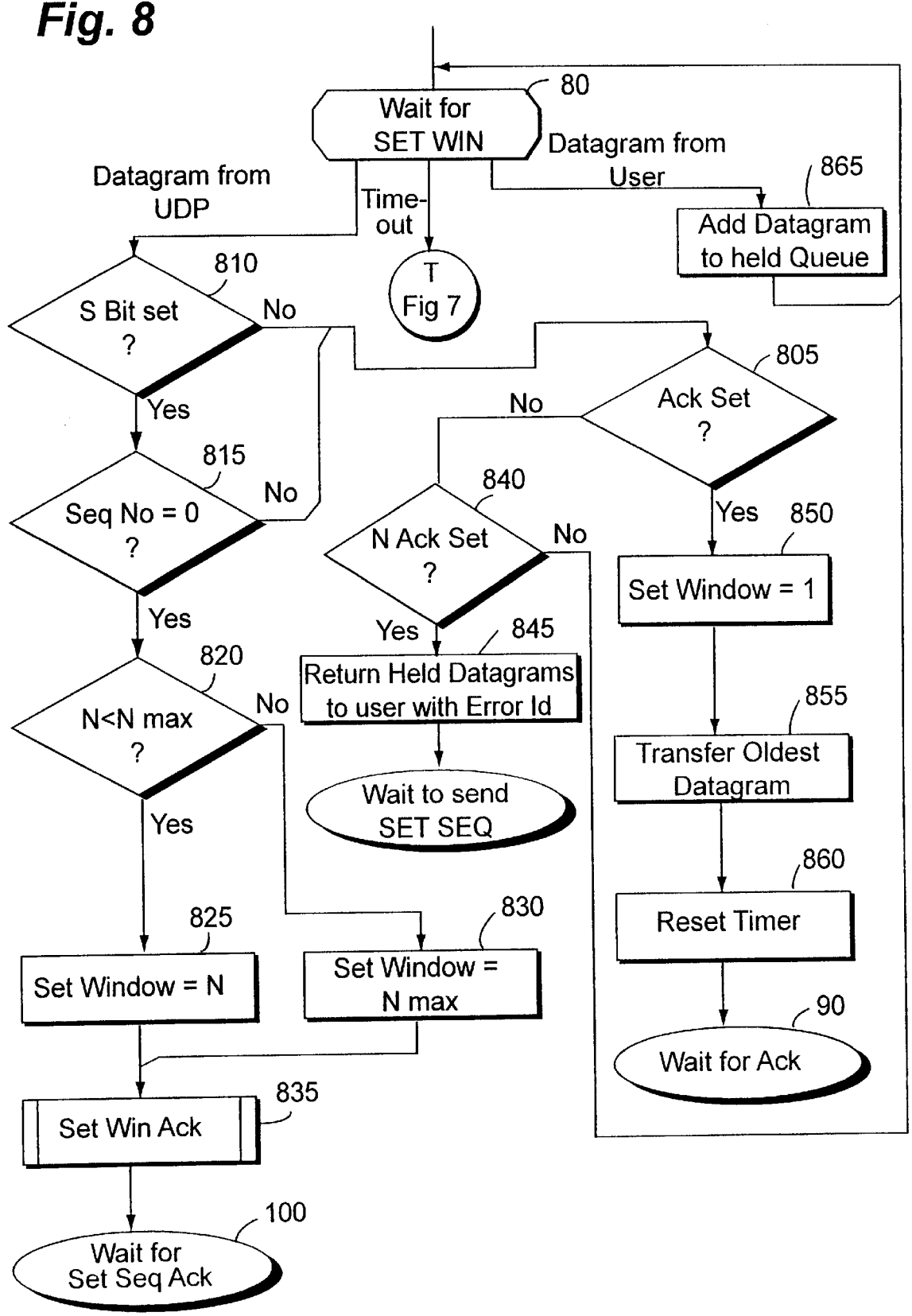

The wait for set window state 80 is shown in more detail in FIG. 8 to which reference is now made. A first exit path arises if a datagram is received from the receiving node by way of the use of UDP module 41 of FIG. 3. The RDP process 50 interrogates the blank field at step 810 to determine if the set bit "S" is set. If the S bit is set then at step 815 the sequence number bit is examined to determine whether it is zero or is equal to the original message number.

If the sequence number is zero it indicates that the receiving end is capable of working with datagrams received in a non-sequential manner and the maximum window size will be held in the datagram part 40. Provided that the value N held in the datagram 40 does not exceed the maximum value of N which the sending node is adapted to work to as determined at step 820 then at step 825 the window value is set to N otherwise at step 830 the window is set to the maximum value which the sending end can handle. A set window acknowledge datagram is now sent to the receiving end this comprising a datagram having an acknowledge and set bits set in the flag field the sequence number set to zero and the datagram set to the window size selected by the transmitting node at steps 825 and 830. The RDP module now enters the wait for set sequence acknowledge state 100.

If however at set 815 it is determined that the sequence number is not equal to zero then the acknowledge bit is interrogated at step 805. If the acknowledge bit is set it would indicate that the receiving end requires to work with only a single message being transferred at any one time. Assuming that the acknowledged bit is not set at step 805 then at step 840 determination as to whether the negative acknowledge is set and if not the ??? window is not exited. If however at step 840 the negative acknowledged bit is set then it would indicate that there is an error in the communication attempt and any datagrams held for transfer to the particular destination node and port will be returned to the user with an error identity at step 845 prior to entering the wait to send set sequence state to reinitialise communication between the sending receiving nodes.

Figure 9:
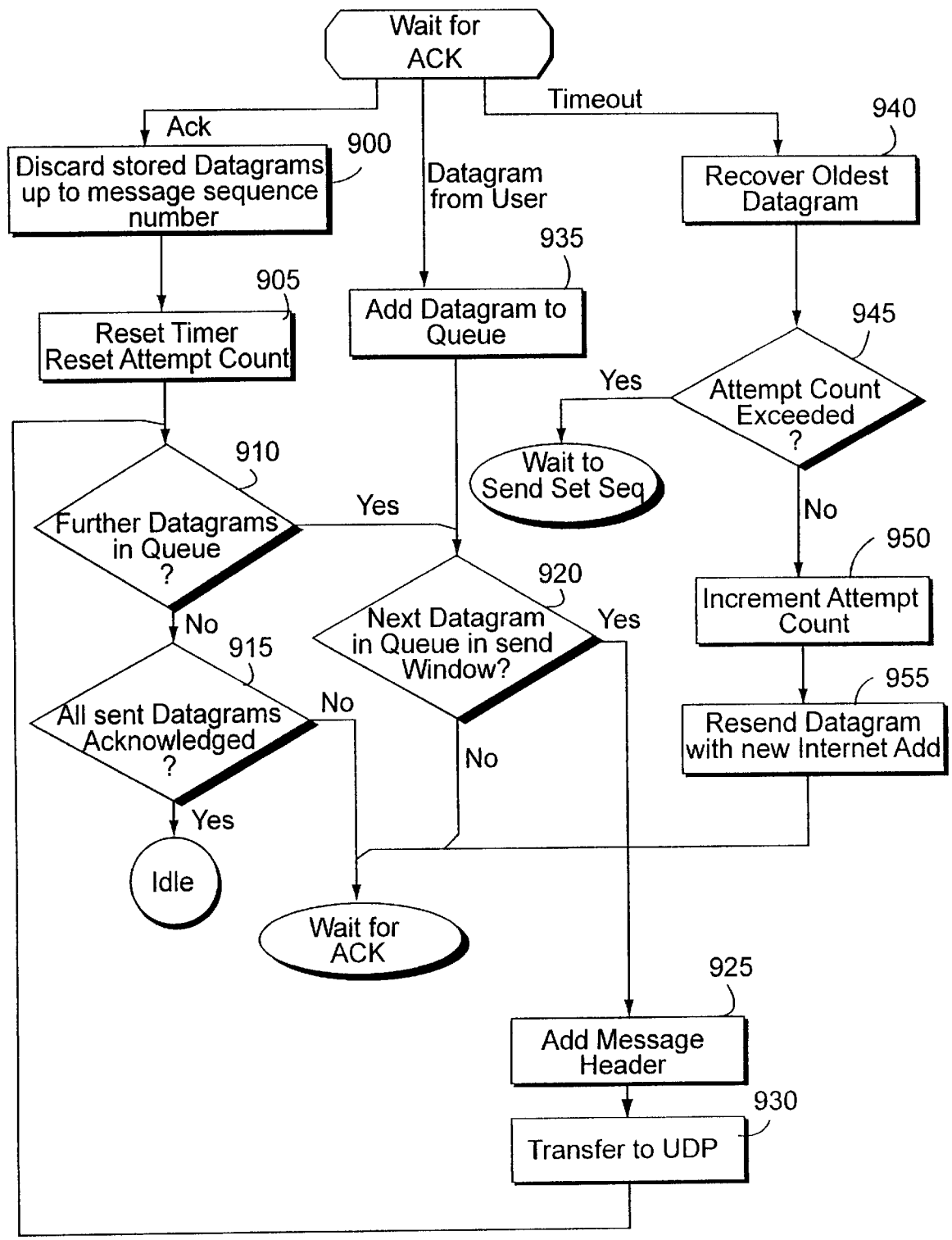

Turning now to FIG. 9 in the wait for acknowledge state the following events are recognised: the previously set time out expiry, a datagram from the UDP module 41 including an acknowledge bit set in the flag field of the header 63 and receipt of a further datagram from the user process.

Considering first the receipt of a datagram including an acknowledge flag, at step 900 all previously held messages up to the acknowledge sequence number are discarded since the acknowledgement of the latest received message means that the previously transmitted datagrams are no longer required to be held. At step 905 the timer as previously set is reset as is an attempt count used in the determination of failed addresses in the address list in respect of the particular node.

At step 910 a determination is made as to whether further datagrams are present in the sent queue and if not at step 915 a check is carried out to determine whether all previously transmitted datagrams have been acknowledged. If all of the previously received datagrams have been acknowledged and there are no further datagrams to be sent then the RDP module 50 enters the idle state awaiting further activity from the user or from the receiving end.

If at step 910 further datagrams are present in the sent queue then at step 920 a determination is made as to whether the next datagram due to be sent falls within the window (N) previously set. If it is within the permitted number of outstanding acknowledgements then a message header is created as herein described at step 930 the latest message is transferred to the UDP module 41 for transmission to the network. The system may now check if there are further datagrams to be sent.

On receipt of a new datagram from one of the user processes at step 935 the received datagram is added to the queue of stored messages to be sent. The procedure then as hereinbefore described with reference to further datagrams requiring transmission at step 920.

If, while waiting for an acknowledge from the receiving end the time-out retransmission occurs then the oldest stored datagram, that is the earliest datagram not yet acknowledged is recovered at step 940 and the destination node address in the address list used to send the datagram is marked as out of service if the number of attempts to send datagrams using the specified address is exceeded (step not shown). At step 945, if a datagram transmission attempt count in respect of the specific datagram has been exceeded then, since several or all addresses in the address list for the requested destination will have been tried the destination may be assumed to be out of service. This results in the return of an error message to the user process with all subsequent unsent datagrams. Assuming that the attempt count has not been exceeded then the attempt count is implemented at step 950 and a further attempt is made at step 955 to send the oldest datagram to a different address in the address list.

Further detailed description of the idle state is not considered necessary for the implementation of the invention except to note that on receipt of a valid datagram from a user process the RDP module 50 returns to the step 935 to send the datagram as hereinbefore described.

In respect of the wait for set sequence acknowledge state 100, on receipt of a set sequence acknowledge in the same manner as shown at steps 805 to 860 of FIG. 8 the system will enter the wait for acknowledge state 90. In the alternative if a negative acknowledge is signalled as determined for example at step 840 of FIG. 8 or by virtue of a time-out occurring in the manner as set out at steps 740 to 745 of FIG. 7 the set sequence acknowledge systems will cause a reset of the system to commence with the wait to send a set sequence state.

Figure 6:
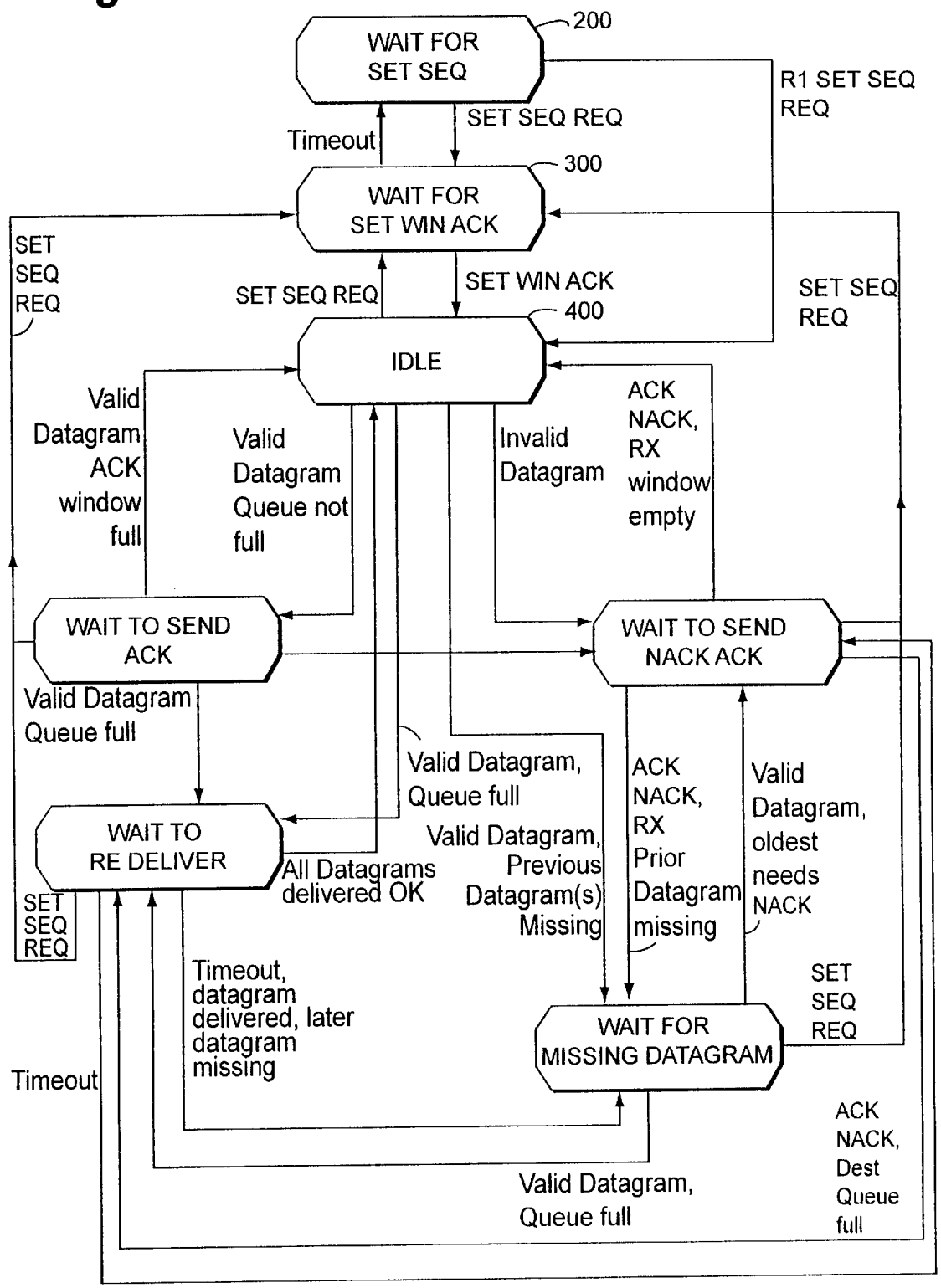
FIG. 6 is a state transition diagram showing the receiving end processor transition activity.
Figure 10:
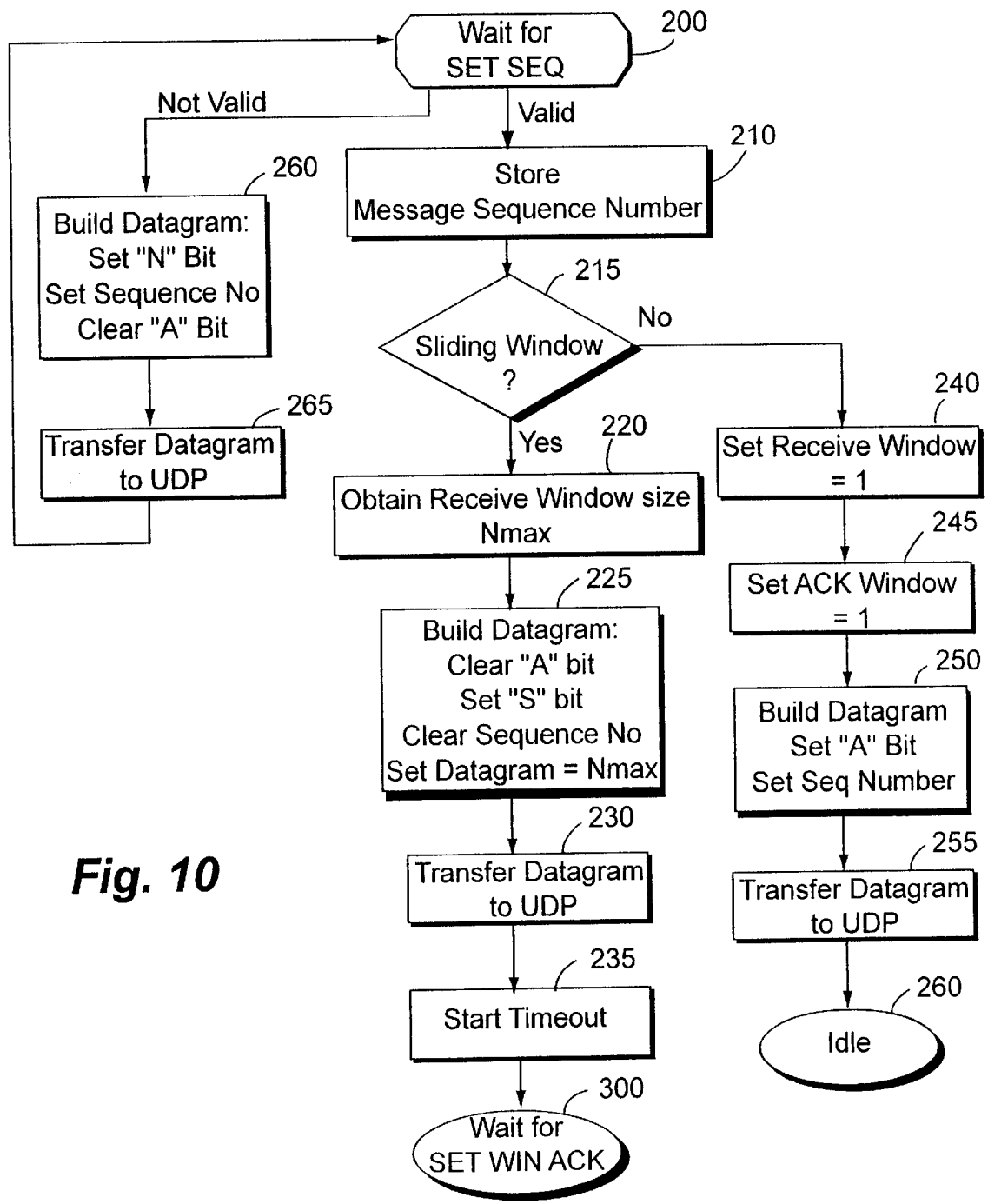
FIGS. 10 to 13 are flowcharts showing a part of the operation of the modules of FIG. 6 in the receiving node.

Referring now to FIG. 6 the receive unit side of the RDP module 50 of FIG. 3 will initially be in a wait for set sequence state 200. Referring additionally to FIG. 10 receipt of a datagram from the UDP module 41 in which the "S" bit of the FL field is set will cause the module to move from this state into examining the received datagram.

At step 210 the sequence number held in the RDP header 63 is stored and further examination of the header confirms whether the transmitting node 10 of FIG. 2 is capable of operating with more than a single outstanding acknowledgement. Thus at step 215 if multiple outstanding datagrams are permissible, than at step 220 the maximum number of outstanding messages which the receiving node 12 can handle is recovered from store and at step 225, this value is transferred to the message part of an RDP datagram, the acknowledge bit is cleared and the set bit of the header 63 flag field FL is set and the sequence number is cleared to indicate to the transmitting node that this is a set window request message. At step 230 the datagram is now transferred to the UDP module 41 for transfer to the Internet network.

At step 235 a timer is started, this timer being set to the acknowledge window size times the anticipated worst round trip time between the sending and receiving nodes 10 and 12. The module 50 now enters the wait for set window acknowledge state 300.

Now at step 215 if it is determined that the transmitting node 10 is not capable of operating with a sliding window protocol then at step 240 the received window is set to ensure that no outstanding unacknowledged datagrams will be permitted and the acknowledged window is set to ensure that all datagrams are acknowledged on receipt in sequential order.

Now at step 250 a datagram is built in which the acknowledge bit is set but the set window acknowledgement is not requested. Thus the returned datagram includes the sequence number as stored and received, the "A" bit set, the "S" bit at zero and again at step 255 the datagram is transferred to the user datagram protocol module 41 and the receive side of the RDP module 50 enters an idle state pending receipt of further datagrams.

Finally with reference to FIG. 10 the action in the wait for set sequence 200, receipt of an invalid datagram results in an error message being returned including a negative acknowledge using at step 260 the "N" bit together with the received sequence number for return at step 265 by way of the user datagram protocol. In this case the RDP module 50 remains in the initial state, that is to say in the wait for set sequence state 200.

Referring again to FIG. 6 in the wait for set window acknowledge state 300 the RDP module 50 of FIG. 3 waits for an acknowledgement of the window size set message previously transmitted at step 230. If the acknowledgement is received from the module with a different value of N held in the datagram and the S bit set then the received window size is adjusted to the new N and a set sequence acknowledge is set in the same manner as at steps 250 and 255 of FIG. 10 before the RDP module enters the idle state to await receipt of a further datagram returning a message from the transmitting node.

Alternatively if the timer set at stage 235 expires the RDP module may be returned to the wait for set sequence state 200 or if a set sequence request is received again the procedure commencing at step 210 of FIG. 10 is repeated.

In the idle state 400 exit is by way of a datagram from the network. Thus referring to FIG. 11 on receipt of a datagram the first step is to obtain the message sequence number from the header 63. Thus at step 405 the sequence number is stripped from the header and at step 410 is compared to ensure that it is in the range of (n–s) to ((n+s)–1) where n is the lowest sequence number received bit not yet acknowledged and s is the number of datagrams the sending module may send without receiving an acknowledgement. This is step 410 and if the message sequence number is out of range then the datagram is discarded and the module 50 remains in the idle state. Assuming that the sequence number is in range that at step 415 a check to see whether this is in fact a duplicate datagram is carried out. Thus if the message sequence received is identical to a previously received message sequence number then it would indicate that the acknowledgement relevant to the datagram has not been received by the transmitting node 10 and that at step 415 an acknowledge is again sent.

If at step 415 it is determined that this is not in fact a duplicate then at step 430 a check is carried out to ensure that only sequentially number messages are transferred to the destination queue. Thus if all previously numbered messages have been received and transferred to the port queue as indicated at step 430 and step 435 determines that there is still space for this message to be stored in the handling queue for the particular port then at step 440 the message is delivered and the wait to send the acknowledge state is entered.

If however a datagram is missing, that is to say that there is a gap in the sequential numbering then the received datagram is temporarily stored at step 450 and a state of waiting for the missing message is entered. Similarly if the port queue is full at step 435, thus indicating that the destination process has not been able to handle messages sufficiently rapidly then at step 460 the message is held in a temporary store. A delivery attempt counter is set at step 465 and the system enters a wait to redeliver state pending the port queue having space.

Figure 11:
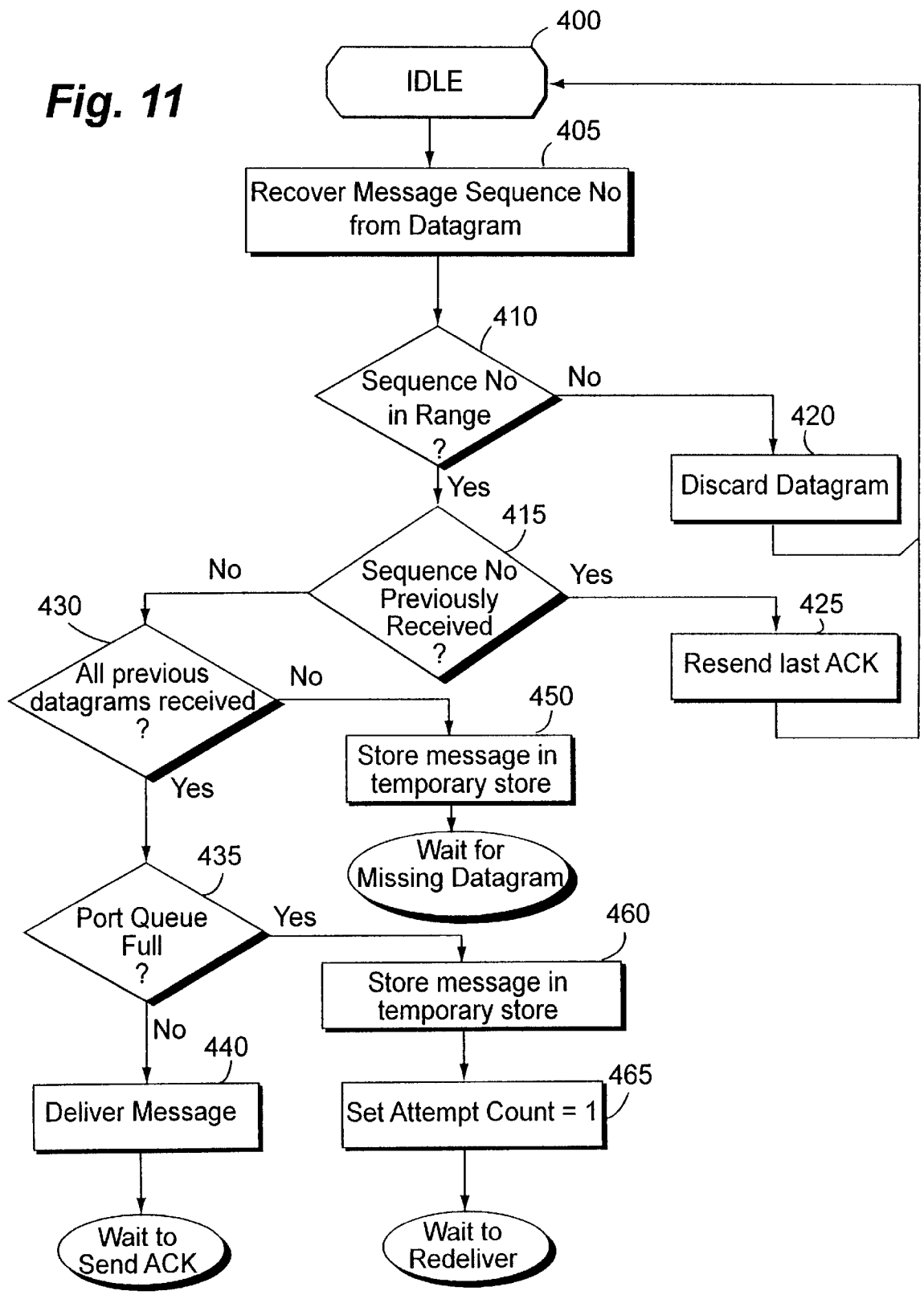
Figure 12:
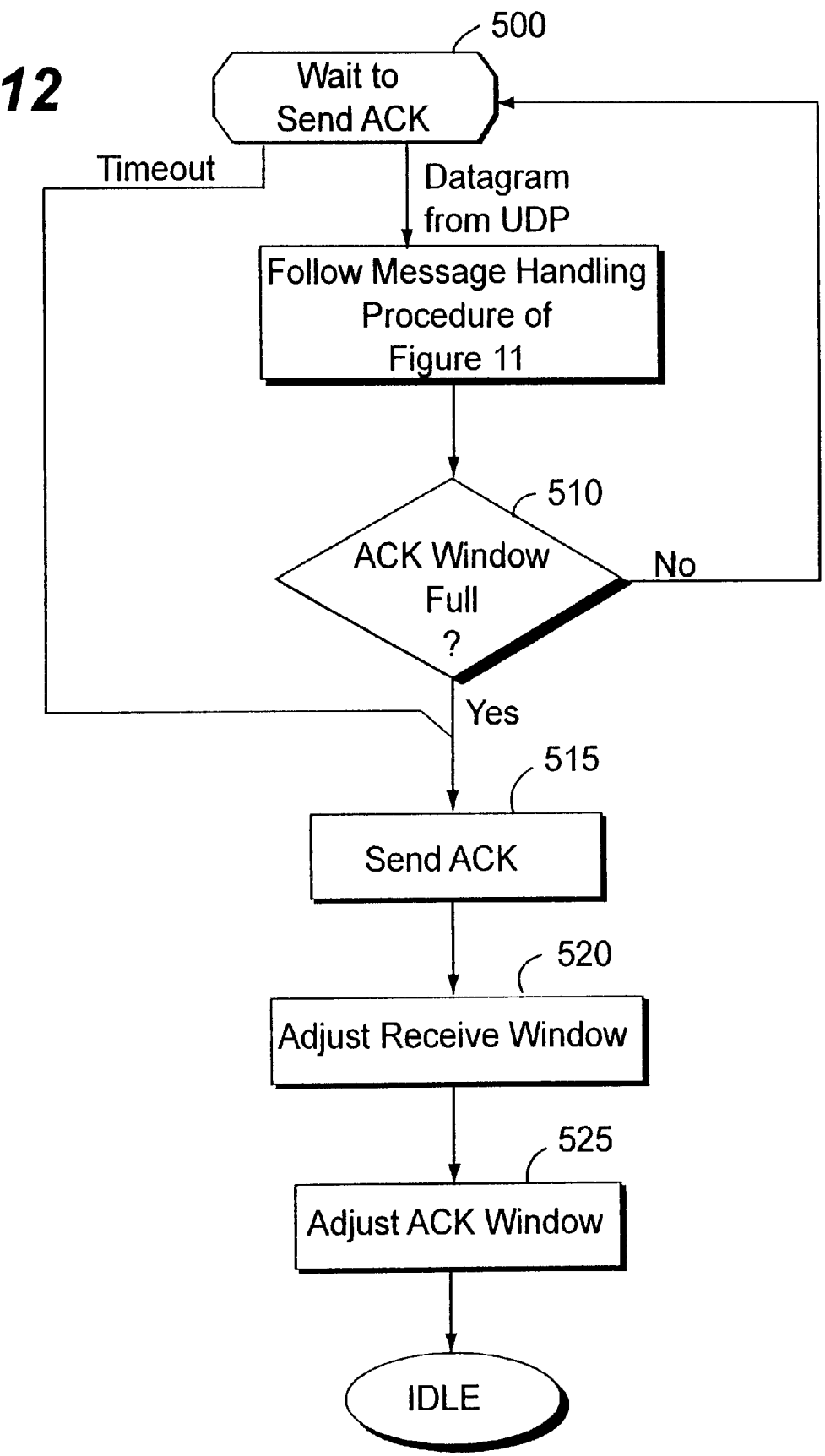

Referring now to FIG. 12: if during the wait to send acknowledge state a further datagram is received from the UDP module 41 then the message handling procedure of FIG. 11 is followed. On return from the message handling procedure the RDP module 50 determines at step 510 whether the maximum permissible number of datagrams to be received without acknowledgement have been received. If the maximum number of received sequential datagrams without acknowledgement has not been received at this stage then the module remains stable in the wait to send back an acknowledged state. If however the number of datagrams receivable without acknowledgement has been reached as determined at step 510 or while in a stable state the timer set on receipt of the first received unacknowledged datagram expires than at step 515 an acknowledgement is sent to the transmitting node followed at steps 520 and 525 respectively by an adjustment of the receive and acknowledge window values.

It is convenient to note here that the control of the flow of datagrams in the send and receiving node is under control of three window limits, these being in the send state machine a send window and in the received state machine received and acknowledge windows. The send window in the send state machine limits the number of datagrams that can be outstanding, that is to say datagrams which have been transmitted but have not yet been acknowledged. As datagrams are acknowledged they are removed from the send queue and the send window is adjusted along the sequence numbers allowing further datagrams to be transmitted. It is noted that the send window is no greater than the received window.

The receive window limits the number of datagrams that can be received and stored, that is to say the number of datagrams that can be assembled by the RDP module 50 and therefore limits the number of datagrams which might be received after a missing datagram. The acknowledge window limits the number of datagrams that may be received in order and stored in the receive queue before sending an acknowledge.

Figure 13:
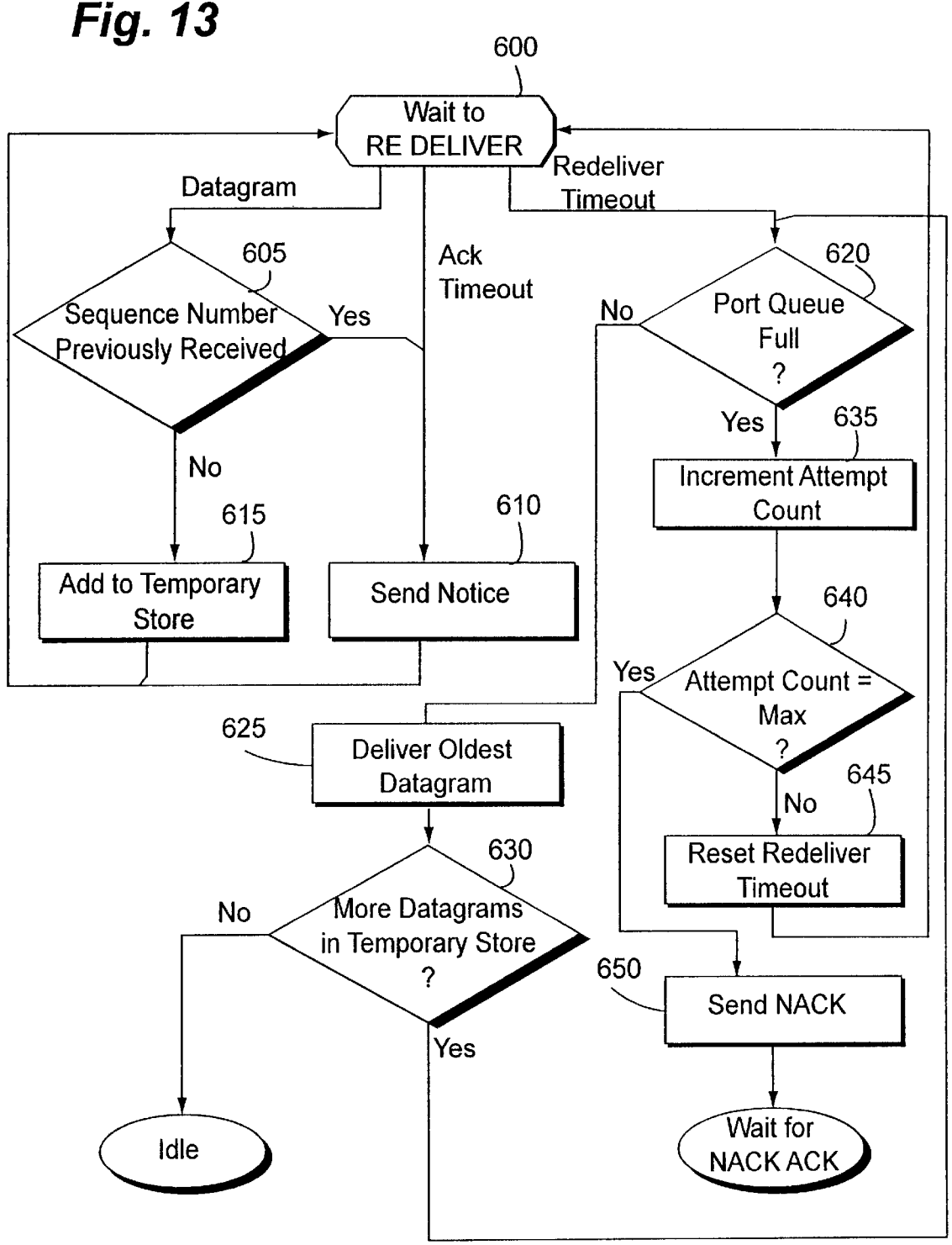

Turning now to FIG. 13 in the wait to redeliver state 600 if the acknowledgement timeout expires or as indicated at step 605 a message bearing a sequence number of a message which has already been received, is received again, then the system transmits a special notice message to the transmitting node indicating that datagrams should not be re-sent pending an acknowledge or negative acknowledge as the receiving process 31 to 3P is not handling a previously queued datagram, provided however at step 605 if a valid datagram is received then it is added to the temporary store pending delivery.

The third state occurs if the redelivery timeout expires in which case at step 620 the process queue is checked and if it is no longer full than at step 625 an attempt is made to deliver the oldest outstanding diagram to the user process queue. Now at 630 having delivered the oldest datagram a check is made to determine whether there are further datagrams awaiting delivery and if not, and provided all previously received datagrams have been acknowledged then the RDP module 50 enters the idle state.

If at set 630 it is determined that further datagrams are available for delivery then attempts are made through the loop of steps 620, 625, step 630 to deliver further datagrams.

If however at step 620 it is determined that the queue is full provided that the attempt count has not reached its maximum value then the redeliver timeout is restarted at step 645.

If by the interrogation of the attempt count it is determined that the number of attempts made to deliver to the queue indicates that the user process has failed a negative acknowledgement is sent at step 650 and the system awaits acknowledgement of the negative acknowledgement transmitted.

The wait for missing datagrams state which may be entered from a number of states where the latest received datagram is identified as not being in sequential order. This state effectively follows the sequence of steps set out in FIG. 11 until such time as all received datagrams are in the correct order.

For the avoidance of doubt it is noted that at any time the set sequence request is received any outstanding received datagrams are ignored and reinitialisation of the communication between the sending node and the receiving node occurs. It is also noted that once communication has been established between two of the nodes then, unless there is a complete network failure it is unlikely that a repeat set sequence request signal will be sent.

What is claimed is:

1. A method of transferring data packets between processes running in a multi-processor environment of the kind comprising a plurality of host computers each accessible at a plurality of network node addresses, the method comprising: establishing for each process to be addressed a destination host identity and a destination host port, establishing for each destination host identity an address list comprising a plurality of corresponding network node addresses, for each transmission of a data packet selecting from the respective address list for the destination host a network node address being the next address cyclically in the list to the last address used for transmission between the nodes, adding to the data packet a header defining the selected network node address and the destination port, monitoring return data for packet acknowledgement and retransmitting any data packet not so acknowledged to the next network node address in the address list.

2. A method of transferring data packets as claimed in claim 1, further characterised in that each message header sent between processes includes a message sequence number which is incremented by the transmitting node to permit the receiving node to identify the absence of one or more messages in a sequence of messages.

3. A method of transferring data packets as claimed in claim 2, further characterised in that the transmitting node increments the sequence number on receipt of an acknowledgement from the receiving node.

4. A method of transferring data packets as claimed in claim 2, further characterised in that the receiving node holds a record of the last received sequence number and on receipt of a data packet including the correct sequence number returns an acknowledgement to the transmitting node and increments its sequence number.

5. A method of transferring data packets as claimed in claim 4, further characterised in that on detection of an incorrect sequence number one less than the correct sequence number the receiving node returns an acknowledgement to the transmitting node.

6. A method of transferring data packets as claimed in claim 4, further characterised in that in the absence of a correctly received sequence number the receiving node returns a message bearing the received sequence number with a flag indicating that an out of sequence data packet has been received.

7. A method of transferring data packets as claimed in claim 2, further characterised in that on identifying the absence of a message in a sequence of messages the receiving node withholds acknowledgement from the transmitting node.

8. A method of transferring data packets as claimed in claim 7, further characterised in that in the absence of an acknowledgement within a predetermined time period, the transmitting node causes the retransmission of any previously forwarded data packet on which an acknowledgement has not previously been received.

9. A method of transferring data packets as claimed in claim 2, further characterised in that the receiving node receives a plurality of data packets from the transmitting node and sends an acknowledgement either on receipt of a predetermined number of data packets or on expiry of a pre-determined period whichever occurs first.

10. A method of transferring data packets as claimed in claim 9, further characterised in that on receiving an acknowledgement carrying a particular message sequence number, the transmitting node determines that all previously numbered data packets have been received.

11. A method of transferring data packets as claimed in claim 10, further characterised in that on receipt of a data packet bearing an out of sequence message number the receiving node stores the data packet until all previously numbered data packets are received prior to sending an acknowledgement of the data packet.

12. A method of transferring data packets as claimed in claim 11, further characterised in that if the receiving node message sequence number of the latest data packet received exceeds the lowest message sequence number of a message not yet received by a predetermined number, the receiving node transmits an acknowledgement of the last data packet received which has the highest sequential message sequence number.

13. A method of transferring data packets as claimed in claim 1, further characterised in that the header includes a fragment number which indicates that the transfer data packet is only a portion of the complete data packet to be transferred between the sending and receiving processes and the receiving node re-assembles the fragments of the complete data packet from a number of transferred data packets for transmission to the receiving process.

14. A method of transferring data packets as claimed in claim 1, further characterised in that any network node address in the respective address list exceeding a predetermined number of data packets failures is eliminated from the address list.

15. A method of transferring data packets as claimed in claim 14, further characterised in that a plurality of attempts are made at periodic intervals to establish a connection to eliminated network node addresses.

* * * * *